United States Patent
Wilson-Thomas et al.

(10) Patent No.: US 11,327,728 B2
(45) Date of Patent: May 10, 2022

(54) SOURCE CODE TEXT REPLACEMENT BY EXAMPLE

(71) Applicant: Microsoft Technology Licensing, LLC, Redmond, WA (US)

(72) Inventors: Mark Alistair Wilson-Thomas, Mercer Island, WA (US); Vu Minh Le, Bellevue, WA (US); Sumit Gulwani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 16/869,414

(22) Filed: May 7, 2020

(65) Prior Publication Data

US 2021/0349698 A1    Nov. 11, 2021

(51) Int. Cl.
G06F 9/44    (2018.01)
G06F 8/36    (2018.01)
G06F 8/33    (2018.01)
G06F 8/51    (2018.01)

(52) U.S. Cl.
CPC ............... *G06F 8/36* (2013.01); *G06F 8/33* (2013.01); *G06F 8/51* (2013.01)

(58) Field of Classification Search
None
See application file for complete search history.

(56) References Cited

U.S. PATENT DOCUMENTS

| 8,566,789 B2 | 10/2013 | Siddaramappa et al. |
| 2005/0166193 A1 | 7/2005 | Smith et al. |
| 2007/0299793 A1 | 12/2007 | Musuvathi et al. |
| 2008/0172650 A1 | 7/2008 | Gulwani et al. |
| 2008/0276025 A1 | 11/2008 | Cherem et al. |
| 2008/0282108 A1 | 11/2008 | Jojic et al. |
| 2008/0301655 A1 | 12/2008 | Gulwani et al. |
| 2009/0276763 A1 | 11/2009 | Gulwani et al. |

(Continued)

OTHER PUBLICATIONS

"Notice of Allowance Issued in U.S. Appl. No. 16/860,535", dated Mar. 26, 2021, 18 Pages.

(Continued)

*Primary Examiner* — Anna C Deng
(74) *Attorney, Agent, or Firm* — Ogilvie Law Firm

(57) ABSTRACT

Flexible yet efficient "find" operations search source code for matches to a general pattern after a developer provides an example string that matches the pattern, without requiring the developer to write a regular expression or script that will implement the desired pattern. Example-driven find-replace functionality uses regular expressions or other pattern match codes, and scripts or other transforms, which are synthesized automatically from examples provided by a developer. This technology allows the developer to focus on workflow inside an integrated development environment instead of breaking focus to search for external documentation, or unfortunately foregoing the flexibility and power of regular expressions and scripts. Synthesizer outputs may be directly or indirectly ranked through user feedback, allowing their refinement. Find match generality may be controlled, e.g., by specifying regex star positions or star counts. Entry of guiding examples may be assisted by autocompletion. Performance criteria are also described.

20 Claims, 3 Drawing Sheets

(56) References Cited

U.S. PATENT DOCUMENTS

| | | |
|---|---|---|
| 2009/0326907 A1 | 12/2009 | Gulwani et al. |
| 2009/0327997 A1 | 12/2009 | Gulwani et al. |
| 2010/0088548 A1 | 4/2010 | Gulwani et al. |
| 2010/0088684 A1 | 4/2010 | Gulwani et al. |
| 2010/0318980 A1 | 12/2010 | Gulwani et al. |
| 2011/0078665 A1 | 3/2011 | Gulwani et al. |
| 2011/0225572 A1 | 9/2011 | Stoicescu et al. |
| 2011/0302553 A1 | 12/2011 | Gulwani et al. |
| 2012/0011084 A1 | 1/2012 | Gulwani et al. |
| 2012/0011152 A1 | 1/2012 | Gulwani et al. |
| 2012/0192051 A1 | 7/2012 | Rothschiller et al. |
| 2012/0197829 A1 | 8/2012 | Nori et al. |
| 2012/0198322 A1* | 8/2012 | Gulwani ............... G06F 40/18 715/217 |
| 2013/0144902 A1 | 6/2013 | Gulwani et al. |
| 2013/0188877 A1 | 7/2013 | Gulwani et al. |
| 2013/0275847 A1 | 10/2013 | Gulwani et al. |
| 2013/0326475 A1 | 12/2013 | Gulwani et al. |
| 2013/0346982 A1* | 12/2013 | Kalai ................. G06N 5/025 718/100 |
| 2014/0013299 A1* | 1/2014 | Bordeaux ............. G06F 8/30 717/106 |
| 2014/0059078 A1* | 2/2014 | Gulwani ............ G06F 16/3344 707/772 |
| 2014/0108305 A1 | 4/2014 | Gulwani et al. |
| 2014/0214399 A1 | 7/2014 | Gulwani et al. |
| 2014/0236554 A1 | 8/2014 | Wang et al. |
| 2014/0236991 A1 | 8/2014 | Gulwani et al. |
| 2014/0282375 A1 | 9/2014 | Gulwani et al. |
| 2015/0019216 A1 | 1/2015 | Singh et al. |
| 2015/0089297 A1 | 3/2015 | Johnson et al. |
| 2015/0095312 A1 | 4/2015 | Gulwani et al. |
| 2015/0254211 A1* | 9/2015 | Gulwani ............... G06F 40/103 715/256 |
| 2015/0254353 A1* | 9/2015 | Gulwani ........... G06F 16/90344 707/706 |
| 2015/0254530 A1* | 9/2015 | Gulwani ............. G06K 9/6261 382/187 |
| 2015/0331416 A1 | 11/2015 | Feniello et al. |
| 2016/0103662 A1 | 4/2016 | Di Balsamo et al. |
| 2016/0299744 A1 | 10/2016 | Kalai et al. |
| 2016/0314408 A1 | 10/2016 | Gulwani et al. |
| 2016/0350276 A1 | 12/2016 | Gulwani et al. |
| 2017/0075661 A1* | 3/2017 | Gulwani .................. G06F 8/35 |
| 2017/0091589 A1 | 3/2017 | Gulwani et al. |
| 2017/0212829 A1 | 7/2017 | Bales et al. |
| 2017/0220673 A1 | 8/2017 | Gulwani et al. |
| 2018/0039693 A1* | 2/2018 | Singh .................. G06F 16/3335 |
| 2018/0107724 A1* | 4/2018 | Ganjam ................ G06F 21/604 |
| 2018/0113848 A1* | 4/2018 | Gulwani ........... G06K 9/00463 |
| 2018/0113873 A1* | 4/2018 | Gulwani ............. G06F 15/0266 |
| 2018/0113887 A1 | 4/2018 | Le et al. |
| 2018/0113890 A1 | 4/2018 | Raza et al. |
| 2018/0113894 A1 | 4/2018 | Raza et al. |
| 2018/0113906 A1 | 4/2018 | Gulwani et al. |
| 2018/0113907 A1* | 4/2018 | Gulwani ............. G06F 16/258 |
| 2018/0113922 A1* | 4/2018 | Gulwani ............. G06F 16/258 |
| 2018/0121525 A1* | 5/2018 | Simmons ............. G06F 16/285 |
| 2018/0150500 A1* | 5/2018 | Le ......................... G06F 16/254 |
| 2018/0150554 A1* | 5/2018 | Le ......................... G06F 16/215 |
| 2018/0188897 A1* | 7/2018 | Gulwani .................. G06F 8/30 |
| 2018/0246915 A1* | 8/2018 | Singh .................. G06F 16/221 |
| 2019/0034437 A1* | 1/2019 | Gulwani ............. G06F 40/211 |
| 2019/0102438 A1* | 4/2019 | Murray ................ G06F 16/221 |
| 2019/0171422 A1 | 6/2019 | Udupa et al. |
| 2019/0212989 A1 | 7/2019 | Polozov et al. |
| 2019/0235842 A1 | 8/2019 | Raza et al. |
| 2019/0311004 A1 | 10/2019 | Gulwani et al. |
| 2019/0311022 A1 | 10/2019 | Fan et al. |
| 2019/0324730 A1 | 10/2019 | Gulwani et al. |
| 2019/0332704 A1 | 10/2019 | Gulwani et al. |
| 2019/0347267 A1 | 11/2019 | Le et al. |
| 2019/0384763 A1 | 12/2019 | Malak et al. |
| 2019/0384851 A1 | 12/2019 | Le et al. |
| 2020/0097261 A1* | 3/2020 | Smith .................. G06N 3/0454 |

OTHER PUBLICATIONS

Bartoli, et al., "Automatic Search-and-Replace From Examples With Coevolutionary Genetic Programming", In Journal of IEEE Transactions on Cybernetics, vol. 51, Issue 5, May 2021, pp. 2612-2624.

Deng, et al., "Unsupervised String Transformation Learning for Entity Consolidation", In Proceedings of IEEE 35th International Conference on Data Engineering, Apr. 8, 2019, pp. 196-207.

Rolim, et al., "Learning quick fixes from code repositories", In Repository of arXiv:1803.03806v1, Mar. 10, 2018, pp. 1-13.

"International Search Report and Written Opinion Issued in PCT Application No. PCT/US21/022528", dated Jun. 28, 2021, 13 Pages.

David Ramel, "Microsoft Boosts AI-Assisted Developer Productivity", retrieved from <<https://visualstudiomagazine.com/articles/2019/11/05/ai-tooling.aspx>>, Nov. 5, 2019, 7 pages.

Risabh Sing, et al., "Transformin g Spreadsheet Data Types Using Examples", retrieved from <<http://people.csail.mit.edu/rishabh/papers/popl16-semantic.pdf>>, 2016, 14 pages.

Risabh Sing, et al., "Synthesizing Number Transformations from Input-Output Examples", retrieved from <<https://www.microsoft.com/en-us/research/wp-content/uploads/2016/06/cav12-1-1.pdf>>, 2016, 18 pages.

Risabh Sing, et al., "Learning Semantic String Transformations from Examples", retrieved from <<http://vldb.org/pvldb/vol5/p740_rishabhsingh_vldb2012.pdf>>, 2012, 12 pages.

Lars Vogel, "Regular expressions in Java—Tutorial", retrieved from <<https://www.vogella.com/tutorials/JavaRegularExpressions/article.html>>, 2019, 15 pages.

"Document.querySelector()", retrieved from <<https://developer.mozilla.org/en-US/docs/Web/API/Document/querySelector>>, no later than Apr. 1, 2020, 16 pages.

"Microsoft Program Synthesis using Examples SDK", retrieved from <<https://microsoft.github.io/prose/>>, no later than Apr. 1, 2020, 2 pages.

"Tutorial", retrieved from <<https://microsoft.github.io/prose/documentation/prose/tutorial/>>, no later than Apr. 1, 2020, 13 pages.

"Intelligent code completion", retrieved from <<https://en.wikipedia.org/wiki/Intelligent_code_completion>>, Jan. 24, 2020, 5 pages.

"Autocomplete", retrieved from <<https://en.wikipedia.org/wiki/Autocomplete>>, Mar. 12, 2020, 8 pages.

"Integrated development environment", retrieved from <<https://en.wikipedia.org/wiki/Integrated_development_environment>>, Feb. 11, 2020, 4 pages.

Amanda Silver, "Introducing Visual Studio IntelliCode", retrieved from <<https://devblogs.microsoft.com/visualstudio/Introducing-visual-studio-intellicode/>>, May 7, 2018, 5 pages.

Anders Miltner, et al., "On the Fly Synthesis of Edit Suggestions", retrieved from <<https://www.microsoft.com/en-us/research/uploads/prod/2019/08/PBE-OOPSLA-2019.pdf>>, 2019, 29 pages.

Gabriele Tomassetti, "A Guide to Code Generation", retrieved from <<https://tomassetti.me/code-generation/>>, May 9, 2018, 33 pages.

"Pick the right tools for .NET development", retrieved from <<https://www.jetbrains.com/dotnet/promo/tools/>> no later than Apr. 2, 2020, 5 pages.

"PyCharm", retrieved from <<https://en.wikipedia.org/wiki/PyCharm>>, Feb. 29, 2020, 3 pages.

"Eclipse (software)", retrieved from <<https://en.wikipedia.org/wiki/Eclipse_(software)>>, Mar. 31, 2020, 12 pages.

Ian Drosos, et al., "Wrex: A Unifed Programming-by-Example Interaction for Synthesizing Readable Code for Data Scientists", retrieved from <<https://www.microsoft.com/en-us/research/uploads/prod/2020/03/chi20c-sub4932-cam-16.pdf»>, no later than Apr. 2, 2020, 12 pages.

(56) References Cited

OTHER PUBLICATIONS

"Find patterns in strings with the Microsoft PROSE Code Accelerator SDK", retrieved from <<https://docs.microsoft.com/en-us/python/api/overview/azure/prose/findpatterns?view=prose-py-latest>>, Sep. 24, 2018, 7 pages.

"Programming language", retrieved from <<https://en.wikipedia.org/wiki/Programming_language>>, Apr. 14, 2020, 22 pages.

Nicholas Samuel, "How to Format Dates in Python", retrieved from <<https://stackabuse.com/how-to-format-dates-in-python/>>, no later than Apr. 17, 2020, 16 pages.

Beau Carnes,"The Python Modulo Operator—What Does the % Symbol Mean in Python? (Solved)", retrieved from <<https://www.freecodecamp.org/news/the-python-modulo-operator-what-does-the-symbol-mean-in-python-solved/>>, Dec. 29, 2019, 6 pages.

"What is $1 and $2 in Regular Expressions?", retrieved from <<https://stackoverflow.com/questions/19141069/what-is-1-and-2-in-regular-expressions/19141152#19141152>>, Oct. 2, 2013, 3 pages.

"EditPad Lite: Basic Text Editor with Full Regular Expression Support", retrieved from <<https://www.regular-expressions.info/editpadlite.html>>, Mar. 20, 2020, 2 pages.

"Structural search and replace", retrieved from <<https://web.archive.org/web/20191209221136/https:/www.jetbrains.com/help/idea/structural-search-and-replace.html>>, Dec. 9, 2019, 9 pages.

Zhengong Cai, et al., "A Pattern-Based Code Transformation Approach for Cloud Application Migration", retrieved from <<https://docplayer.net/18105214-A-pattern-based-code-transformation-approach-for-cloud-application-migration.html>>, no later than Apr. 14, 2020, 8 pages.

Alberto Bartoli, et al., "Automatic Synthesis of Regular Expressions from Examples", retrieved from <<https://arts.units.it/retrieve/handle/11368/2758954/57751/2014-Computer-AutomaticSynthesisRegexExamples%20(2).pdf>>, Jul. 5, 2013, 16 pages.

Alberto Bartoli, et al., "Inference of Regular Expressions for Text Extraction from Examples", retrieved from <<https://www.human-competitive.org/sites/default/files/bartoli-delorenzo-medvet-tarlao-tkde-paper.pdf>>, May 2016, 14 pages.

Alvis Brazma, "Efficient Identification of Regular Expressions from Representative Examples", retrieved from <<https://dl.acm.org/doi/pdf/10.1145/168304.168340?download=true>>, 1993, 7 pages.

Xinyu Wang, et al., "FIDEX: Filtering Spreadsheet Data using Examples", retrieved from <<https://www.microsoft.com/en-us/research/wp-content/uploads/2016/12/oopsla16-spreadsheet.pdf»>>, 2016, 20 pages.

Saswat Padhi, et al., "FlashProfile: A Framework for Synthesizing Data Profiles", retrieved from <<https://www.microsoft.com/en-us/research/publication/flashprofile-a-framework-for-synthesizing-data-profiles/>>, 2018, 2 pages.

Saswat Padhi, et al., "FlashProfile: A Framework for Synthesizing Data Profiles", retrieved from <<https://alexpolozov.com/papers/oopsla2018-flashprofile.pdf>>, 2018, 28 pages.

"FIDEX: Filtering Spreadsheet Data using Examples", retrieved from <<https://www.youtube.com/watch?v=4-AjWkRGHC4>>, 2016, 1 page.

"International Search Report and Written Opinion Issued in PCT Application No. PCT/US21/022468", dated Jun. 22, 2021, 13 Pages.

\* cited by examiner

SOURCE CODE TEXT REPLACEMENT BY EXAMPLE

BACKGROUND

Computer software is written in computer programming languages, which may also be referred to as "programming languages" or even as "languages" when the context excludes "natural languages" such as English, Spanish, Chinese, and so on. Computer software in this textual form is often called "source code". To allow execution of the software in a computing system, the source code is translated into "machine language" that is recognized by the processing chips and other hardware of the computing system. Translation may be done by tools which are themselves computer programs, known individually as "compilers" or "interpreters" and collectively as "translators". To permit translation, source code must conform with syntax rules (rules of form) that are enforced by the translator. To perform operations that produce the intended results of program execution, the source code must also properly implement those operations in a manner that is consistent with the semantics (rules of meaning) of the programming language. "Developers" are people who write or modify source code in an effort to achieve the desired semantics within the desired syntax while also meeting other goals, e.g., execution speed targets, limits on computing resource usage, ease of use, reliability, and so on.

The foregoing is merely an introduction. For instance, previously translated software in the form of libraries, operating systems, or hypervisors may also be invoked or otherwise relied upon by a given program. But even when previously translated software is available, developers are often called upon to create new source or to modify existing source code. Accordingly, technologies that may help developers edit source code are sometimes worth investigating.

SUMMARY

Some embodiments described in this document provide improved technology for software development which increases developer productivity. Some embodiments facilitate flexible yet efficient "find" operations which search source code for textual matches to a pattern after the user provides an example of a string that matches the pattern; the pattern encompasses more than the literal string that was provided by the user, without requiring the user to write a regular expression or script that implements the pattern matching. Some embodiments provide text find-replace operations using pattern match code and transforms that are synthesized on the basis of hypothetical or real before-and-after examples provided by a developer, thereby allowing the developer to focus the workflow within an integrated development environment instead of breaking focus to go search online forums or other external documentation for potentially helpful regular expressions or scripts or to forego the flexibility and power of regular expressions and scripts.

Some embodiments use or provide a software development hardware and software combination which includes a digital memory, a processor which is in operable communication with the memory, and an executable software development tool having a user interface. The processor is configured, e.g., by tailored software, to perform software development workflow steps for example-driven text replacement in a source code which is displayed in the user interface. The steps may include (a) receiving through the user interface a text-to-find example and a corresponding replacement-text example, (b) submitting the examples to a pattern match code and transform synthesizer, (c) getting from the pattern match code and transform synthesizer a pattern match code and a corresponding transform, (d) locating in the source code a match, namely, an instance of source code text that matches a pattern defined by the pattern match code, (e) applying the transform to a copy of the match thereby producing a transformed match, and (f) displaying the match and the transformed match in the user interface. In this manner, these embodiments provide a software developer with a pattern matching find-replace functionality without requiring the developer to author the pattern match code or the transform. Moreover, the embodiments can accomplish this without requiring the developer to consult any regular expression or scripting guidance that is located outside the user interface, such as code repositories, developer online forums, or textbooks.

Some embodiments use or provide steps of a software development workflow method that is suitable for performance by a software development tool which has a user interface. The steps may include automatically receiving through the user interface a text-to-find example and a corresponding replacement-text example, submitting the examples to a pattern match code and transform synthesizer, getting from the pattern match code and transform synthesizer a pattern match code and a corresponding transform, locating in the source code a match, namely, an instance of source code text that matches a pattern defined by the pattern match code, applying the transform, thereby producing a transformed text, the transform being applied to the match or to a copy of the match, and displaying the transformed text in the user interface.

Some embodiments use or provide a computer-readable storage medium configured with data and instructions, or use other computing items, which upon execution by a processor cause a computing system to perform a method to perform a software development workflow method. In particular, some embodiments include entering through a user interface of a development tool a text-to-find example, and performing at least one match-viewing action of a match-viewing action group. The match-viewing action includes viewing in the user interface at least one match which is an instance of source code text that differs from the text-to-find example and also matches the text-to-find example according to a regular expression which is part of a pattern match code. In some embodiments, the match-viewing action group includes: viewing multiple matches in the user interface; viewing multiple matches in the user interface and ranking the matches relative to one another; viewing multiple matches in the user interface and assigning a positive feedback to at least one match; or viewing multiple matches in the user interface and assigning a negative feedback to at least one match.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
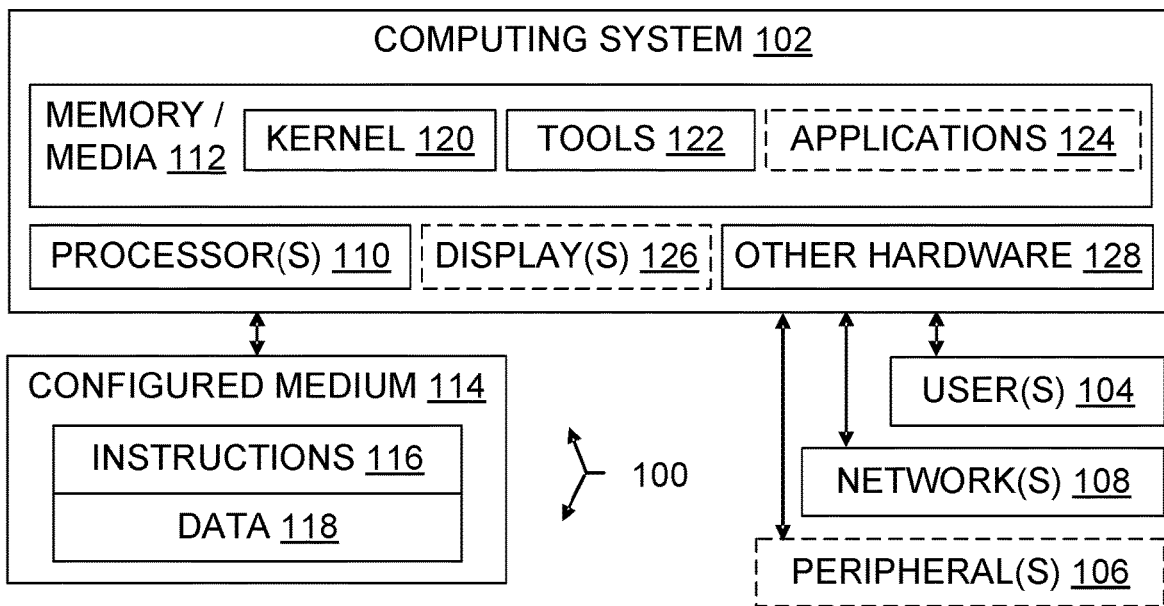
FIG. 1 is a block diagram illustrating computer systems generally and also illustrating configured storage media generally.
Figure 2:
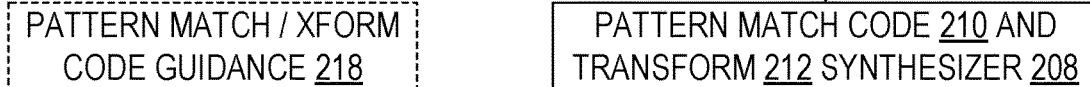
FIG. 2 is a block diagram illustrating a computing system equipped with example-driven text pattern match functionality, and some aspects of a surrounding context.

Innovations may expand beyond their origins, but understanding an innovation's origins can help one more fully appreciate the innovation. In the present case, some teachings described herein were motivated by technical challenges faced by Microsoft innovators who were working to improve the feature set and usability of Microsoft development tool offerings, including some versions of Microsoft Visual Studio® or VSCode™ integrated development environments (marks of Microsoft Corporation).

Initially, the innovators recognized that developers made scant use of regular expressions in text searches, even though some editors allow a user to type in a regular expression and then perform a search of one or more files (e.g., one or more source code files) using the regular expression entered by the user. That is, although some editor tools allowed a find operation to be guided by a regular expression which was provided to the editor tool by the person using the tool, people were using that capability only rarely. One set of telemetry showed regex find-replace invocations were only about two percent of all find-replace invocations.

Developers often find themselves needing to make pattern operations which involve finding a particular pattern of source code and replacing it with a different pattern. This may be easy when the replacement is a simple matter of replacing the exact same text each time with a common replacement string, e.g., find all instances of "fobar" and replace each with "foobar". This is an illustration of a low variability scenario, namely, a scenario in which an extended regular expression (a.k.a. "regex" with named binding to parts of a string) could be used, but is typically not used, because regular expressions are more powerful than required to accomplish the desired find-and-replace and are often difficult to write and hard to understand.

Replacing "string-one" with "sequence-two" is easy. However, if there is any greater variability in the target to be replaced or in the item which is replacing it (which often occurs in programming), then the task becomes considerably more challenging. High variability scenarios require the expressive power of a regular expression, of a scripting language, or of some functionality which is at least as capable as these. In practice, as suggested by the telemetry finding of two percent regular expression usage, the main functionality called upon is often a human developer's manual text editing ability.

As an illustration of high variability scenarios, suppose a developer wants to update some source code to use a different graphics library. For instance, suppose a pixel drawing routine in a new library takes an alpha channel (i.e., transparency) parameter that was not used in the corresponding routine in the old library. For now, the transparency will always be zero, but the code will crash if no transparency is passed when the new routine is called. That is, a routine call that looks like this using the old graphics library:
drawPix(x, y, color) should look like this using the new graphics library:
paintPixel(x, y, color, 0.0)

Low variability search-and-replace functionality can find "drawPix(" and replace it with "paintPixel(". But the rest of this desired replacement is not easily accomplished throughout a code base by using only low variability search-and-replace functionality, because of the need to add the 0.0 to each call and because the parameters in a given call are not always the same strings "x" and "y" and "color". For instance, one cannot simply search for "color)" and replace it with "color, 0.0)" even though that would work for the particular example above.

That is, suppose the developer would like to easily and accurately make each of the following replacements, and also make all of the other replacements that are like these, that appear anywhere in the code:
drawPix(x, y, color)→paintPixel(x, y, color, 0.0)//introductory example above
drawPix(region[i].x, region[i].y, region[i].hue)→paintPixel(region[i].x, region[i].y, region[i].hue, 0.0)
drawPix(tmpx, tmpy, c)→paintPixel(tmpx, tmpy, c, 0.0)
drawPix(brush.x, brush.y, getColor(brush))→paintPixel(brush.x, brush.y, getColor(brush), 0.0)

The format in these replacement examples is: before→after. That is, the text before the desired replacement is on the left of the arrow, and the text that results from the replacement is on the right of the arrow.

One of skill informed by the teachings herein will acknowledge both the significant risk of errors, and the likely tedium, of using only low variability find-replace operations to make these kinds of changes in a source code file even when only a few dozen such changes are to be made. In some scenarios, hundreds or thousands of such high variability changes are desired.

Writing a regular expression to match the text strings shown above on the left of the desired replacements (the before strings that precede the→) could help decrease both the error rate and the tedium of the find portion of the find-replace operations. But that simply introduces another set of challenges, because regular expressions are difficult and error-prone to write. The difficulty of writing regular expressions may make source code searches based on them quite time-consuming when the regex writing time is included, and therefore the telemetry reveals only scant use of regular expressions as search patterns despite their potential power. The innovators viewed this scant usage of regular expressions in find operations during software development as an opportunity for improvements in development tool functionality, as explained herein.

The innovators recognized that a developer facing a high variability find-replace task had three leading choices. The developer could write one or more regular expressions, which is frequently a difficult task that many developers prefer to avoid. Or the developer could perform the task manually using some combination of substring searches, which would be time-consuming. Or the developer could write custom scripts or macros to achieve the task, which would also be challenging and could be very time-consuming, tedious, and error-prone.

To write the pattern match code that will be used in the first and third options (e.g., the regular expression, script, or macro), a developer can spend significant time searching and scrutinizing documentation (e.g., online forums, language manuals, textbooks, and code located in-house or in repositories) to locate helpful code examples. Moreover, adapting the pattern match code examples that were found would often proceed fitfully by manual trial-and-error until a correct result was obtained. Such approaches to making high variability changes are tedious and error prone.

Embodiments described herein provide a fourth and often better choice. The developer provides the embodiment an example or examples of the before string or after string or both, and the embodiment infers by synthesis a regular expression that allows rapid and powerful automated operations to find or find-and-replace strings that are deemed to be like the example(s). Further, in some embodiments the developer may easily refine the matching expression by marking items in a match list according to whether they do or don't match the developer's desired results.

This kind of source code text replacement by example is significantly easier than hand-crafting a suitable regular expression or script, which saves the developer time and boosts productivity for tasks that benefit from high variability matching. Embodiments described herein have a considerably lower barrier to use than some other approaches (e.g., those with 2% usage) because the user does not need to learn how to write regular expressions to use these embodiments. Moreover, the examples may often be selected from the source code already at hand, which is fresh in the developer's mind, thereby reducing developer context switches.

The innovators faced several technical challenges in their pursuit of these innovations. An initial challenge was how to either replace the three familiar options or improve their usability. This led to the decision to adapt synthesis-by-example technology for use in high variability find and find-replace operations. Some embodiments allow developers to create one or more examples of the desired find result, or desired find-replace result, such as the examples discussed above in the graphics library update scenario. An embodiment may use Microsoft PROSE™ technology or another program synthesis technology to synthesize pattern match code, or text transforms, or both, that implement computational operations that produce the desired results (mark of Microsoft Corporation).

In the graphics library update scenario, for instance, a synthesized regular expression or synthesized macro or synthesized script that performs these text replacements properly would do something like the following:

a. Find an instance of "drawPix(" and note its location.
b. Save a copy of the text between "drawPix(" and the next comma "," as parameter1.
c. Save a copy of the text between that comma and the next comma "," as parameter2.
d. Save a copy of the text between that comma and the next comma "," as parameter3.
e. Note the location of the first right parenthesis ")" after the parameter3 text.
f. Replace the text from and including the instance of "drawPix(" up to and including the right parenthesis ")" with this concatenation: "drawPix("+parameter1+","+parameter2+","+parameter3+","+"0.0)".

As used herein, "synthesized" code is code that is automatically synthesized on the basis of one or more user-provided examples. Although "code generator" and "code synthesizer" may be used interchangeably by some, a distinction is made herein between code synthesis and code generation. Code synthesis creates code based on examples of what the code should produce when executed, e.g., code to match a pattern or code to substitute text according to a pattern. Code generation, by contrast, often involves translation from one computing language to another, e.g., from C++ to machine language, or from Python® to byte code (mark of Python Software Foundation). "Code generation" is also used in reference to other computational activities, but to help avoid confusion, terms such as "synthesized" and "code synthesizer" are used herein, to emphasize the production of code based on user-provided examples.

Upon further consideration, an emergent technical challenge was how to leverage such code synthesizer functionality without also placing productivity dampers on existing software development workflows. One of skill will recognize these and other technical challenges of synthesized code presentation as they are addressed at various points within the present disclosure.

Other aspects of these embodiments, and other software development workflow enhancement embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" (and "execution") are used in a broad sense herein to include (running) machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, example-driven text find-replace functionality or example-driven text find functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems

FIGS. 2 through 5 illustrate an environment having an enhanced system 202, 102 with a software development tool 204 that includes example-driven text pattern match functionality 206. Two variations of example-driven text pattern match functionality 206 are example-driven text find-replace functionality 302 and example-driven text find functionality 402. As used herein, reference numeral 402 refers to functionality that performs example-driven find operations (and to such enhanced find operations themselves), while reference numeral 302 refers to functionality that performs example-driven find-and-replace operations (also called "find-replace" operations or "enhanced find-replace"), and reference numeral 206 refers collectively to either or both of the functionalities 302, 402. Note also that unless otherwise specified, replacement of text is optional in a given instance, so the presence of find-replace functionality 302 does not imply that a replacement capability is always exercised but instead indicates that a replacement capability is available to be exercised at the user's discretion.

In operation, the example-driven text pattern match functionality 206 obtains examples 304 of desired find results or find-replace results from a user 104, and submits the example(s) to a pattern match code and transform synthesizer 208. Given one or more examples of text to match, the synthesizer 208 creates pattern match code 210, such as a regular expression 404 or a script 406 (for present purposes, macros may be considered a kind of script 406).

If the synthesizer 208 is also given one or more user-provided examples 304 of replacement text, then the synthesizer 208 also creates a transform 212. A synthesized transform 212 includes code that upon execution will transform text. In particular, the transform 212 will change the user-provided example of text to find into the user-provided example of replacement text. The transform will also transform other text of a source code 214 that is a match (according to the pattern match code 210) in the same way.

The implementation form of the transform, e.g., script 406 or otherwise, is determined by the synthesizer 208, whose internal workings are beyond the scope of the present disclosure. Likewise, the precise definition of transforming text "in the same way" is determined by internal workings of the synthesizer 208. The present disclosure instead discusses integration of the synthesizer 208 and its creations with a development tool 204, and in particular teaches ways to leverage the synthesizer 208 through coordination with a software development tool user interface 220.

The teachings provided herein can be applied to enhance many kinds of development tools, including source code editors 306 generally and editors in integrated development environments 308 in particular. These teachings can be applied to help developers as they edit source code 214 in various programming languages, such as C#, C++, Objective-C, Fortran, COBOL, Java, Python, Perl, or another general-purpose programming language, other imperative general purpose languages, declarative languages, or special-purpose languages such as those used for string formatting, document object model (DOM) component selection, or other purposes.

This example-driven text pattern match functionality 206 allows a software developer to obtain pattern match code 210 and transform code 212 that operates as desired, without breaking workflow focus by searching and scrutinizing external code guidance 218 such as online forums, language manuals, textbooks, and code located outside the particular project the developer is working on. Indeed, such code guidance 218 need not even be present in the developer's working environment 100.

Figure 3:
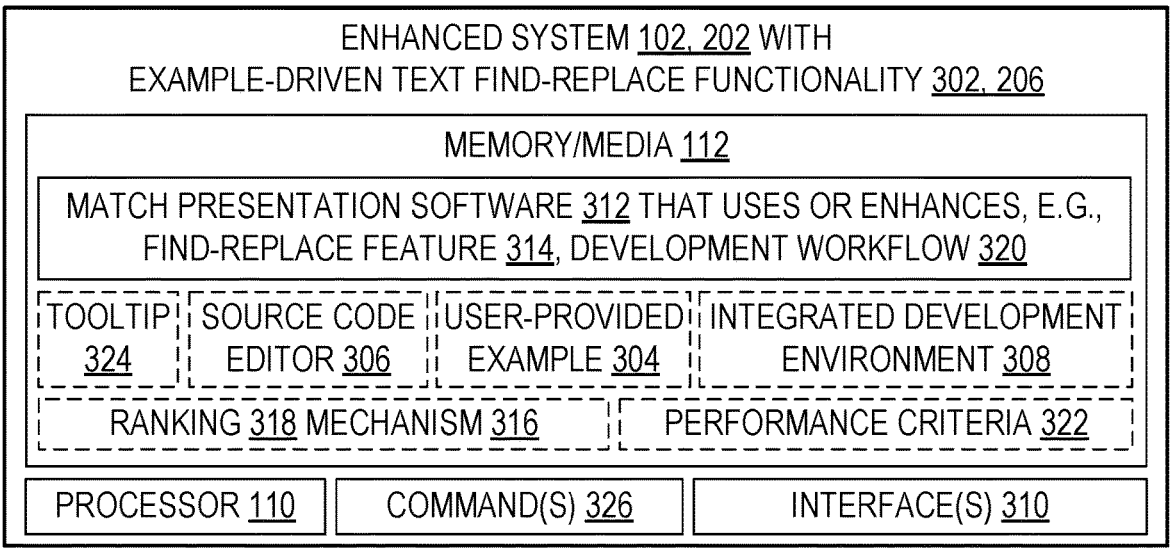
FIG. 3 is a block diagram illustrating an enhanced computing system configured for example-driven text pattern match and optional replacement presentation.

FIG. 3 illustrates an enhanced system 202 which is configured with example-driven text find-replace functionality 302, 206. The system 202 may be networked generally or communicate via network packets, shared memory, shared files, or otherwise with a cloud, other network(s) 108, and other computing devices through one or more interfaces 310. An interface 310 may include hardware such as network interface cards, software such as network stacks, APIs, or sockets, combination items such as network connections, or a combination thereof.

The illustrated system 202 includes match presentation software 312 which performs operations such as displaying dialog boxes and other user interface 220 components 314 that receive find-replace examples 304 from a user, submitting the examples 304 to the synthesizer 208 and getting synthesized pattern match code 210 and synthesized transforms 212 from the synthesizer 208, passing the pattern match code 210 to tool 204 routines that perform text search, and passing the transforms 212 to tool 204 routines that perform text replacement. In particular, the match presentation software 312 may perform a method 700 illustrated in one or more of FIGS. 6 and 7.

Some synthesizer technologies 208, including some versions of Microsoft PROSE™ synthesizers 208, are capable of receiving and learning from multiple examples 304 as a basis for the synthesis of items 210 or 212 or both. In some cases, only positive examples or only negative examples are used, but in other cases both positive examples and negative examples may each guide code synthesis. A positive example illustrates a result the synthesized code should provide upon its execution or other usage (e.g., as a pattern definition), while a negative example illustrates a result the synthesized code should avoid providing upon its execution or other usage. In some embodiments, the synthesizer 208 also outputs clarifying examples, which may then be presented to the user in order to get feedback 432 from the user about the clarifying examples and thereby refine 434 the set of examples on which the pattern match code 210 or transforms 212 or both are based.

Moreover, some synthesizer technologies 208, including some versions of Microsoft PROSE™ synthesizers 208, are capable of synthesizing multiple pattern match codes 210 in response to a single example 410, or in some cases in response to multiple examples 410. Likewise, some synthesizer technologies 208 are capable of synthesizing multiple text transform codes 212 in response to a single example 412, or in some cases in response to multiple examples 412 (which may include examples 410). More generally, the relationship between example(s) 304 submitted to a given synthesizer 208 and items 210, 212 that are synthesized and gotten from the synthesizer 208 based on the submitted example(s) 304 may be one-to-one, one-to-many, many-to-one, or many-to-many in a particular embodiment or even in a particular operational instance.

When multiple items 210 or 212 are synthesized, in some situations they may also be automatically ranked 318. In some embodiments the match presentation software 312 includes or invokes a ranking mechanism 316 which produces a ranking 318 of synthesis results 210, 212, of pattern matching done with synthesized pattern match code 210, of text replacement done with synthesized transforms 212, or a combination thereof. An embodiment which does ranking 318 may do so with one or more ranking mechanisms 316; when multiple ranking mechanisms 316 are used, their results may be given respective weights to determine a final ranking for display. A ranking mechanism 316 may utilize user feedback 432. In some embodiments, a ranking mechanism 316 may utilize a machine learning model that has been trained on the developer's own code so that higher ranked items produce results that more closely resemble the developer's own code. A ranking mechanism 316 may instead or in addition simply measure code length and favor shorter codes 210 or 212 by ranking them higher. Ranking mechanisms 316 may also utilize other ranking criteria.

In some embodiments, the match presentation software 312 is part of, or communicates with, a source code editor 306, or an integrated development environment (IDE) 308.

The match presentation software 312 may be part of both, or communicate with both, since an IDE 308 may include an editor 306.

In some embodiments the match presentation software 312 is designed and configured to comfortably enhance an existing development workflow 320. Such "comfortable enhancement" may be accomplished, e.g., by virtue of an embodiment having one or more of the following characteristics: (a) not requiring a developer to consult guidance 218 outside the development tool 204 user interface 220, (b) enhancing one or more familiar development functionalities such as low variability find or low variability find-replace that do not employ synthesizer results 210 or 212, (c) utilizing familiar user interface mechanisms (albeit in new ways) such as dialog boxes, tooltips 324, cursors, visual highlighting, and flowing of text in response to text replacement, (d) utilizing enhanced commands 326 which build on and extend the power or efficiency or usability of familiar commands, e.g., an enhanced find command or an enhanced find-replace command (new commands may also be present, e.g., for controlling ranking 318 or generality 408), (e) using pattern match code 210 or transform 212 syntax and semantics that are consistent with the particular version of a regex 404 or script 406 that is recognized in the developer's current development context, or (f) satisfying performance criteria 322 that make enhanced find or enhanced find-replace fast enough to avoid developer frustration from waiting for results to appear in the source code 214 or elsewhere in the user interface 220. Some embodiments have one of these comfortable enhancement characteristics; some have two, some have three, some have four, some have five, and some have all six.

Figure 4:
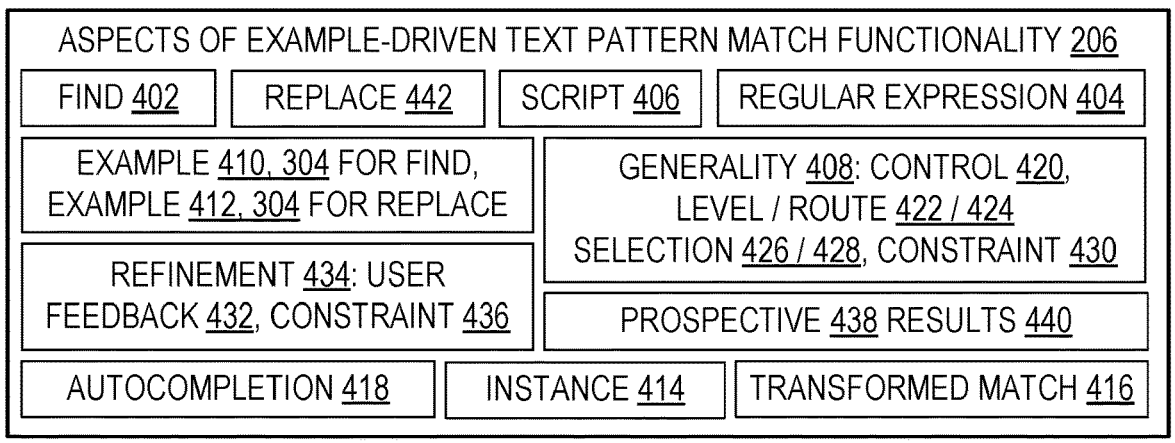
FIG. 4 is a block diagram illustrating some aspects of some example-driven text pattern match functionality.
Figure 5:
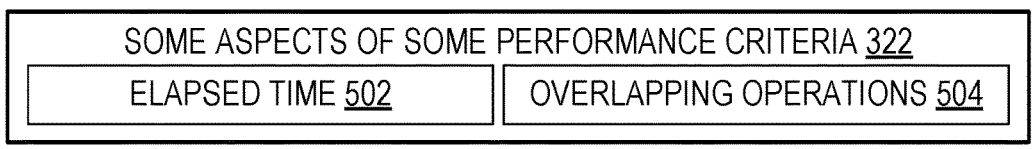
FIG. 5 is a block diagram illustrating some examples of performance criteria for some enhanced systems.

FIG. 4 illustrates some aspects of example-driven text pattern match functionality 206. FIG. 5 illustrates some examples of performance criteria 322. These illustrated items are discussed at various points herein, and additional details regarding them are provided in the discussion of a List of Reference Numerals later in this disclosure document.

With reference now to all of the drawing figures, some embodiments use or provide a functionality-enhanced system, such as system 202 or another system 102 that is enhanced as taught herein. In some embodiments, a system which is configured for software development includes a digital memory 112, an executable software development tool 204 having a user interface 220, and a processor 110 in operable communication with the memory. The processor 110 is configured to perform software development workflow 320 steps for example-driven text replacement in a source code 214 which is displayed in the user interface 220. The steps may include (a) receiving through the user interface a text-to-find example 410 and a corresponding replacement-text example 412, (b) submitting the examples 410, 412 to a pattern match code and transform synthesizer 208, (c) getting from the pattern match code and transform synthesizer 208 a pattern match code 210 and a corresponding transform 212, (d) locating in the source code a match, namely, an instance 414 of source code text that matches a pattern 222 defined by the pattern match code 210, (e) applying the transform 212 to a copy of the match 414 thereby producing a transformed match 416, and (f) displaying the match 414 and the transformed match 416 in the user interface 220. This system 202 provides a software developer 104 with a pattern matching find-replace functionality 302 without requiring the developer to author the pattern match code 210 or to author the transform 212.

As further illustration, in a particular situation the enhanced system 202 may operate as follows. The enhanced system 202 receives a find-replace example 304 from the user. With the understanding that an example may be entered in a GUI in some embodiments, for the sake of clarity and breadth some examples 304 are shown herein as text in the before→after format. One such example is:
_platformActions.InstallApp(x,y,z)→this.Platform( ).App(x,y,z),Install( ))

The system 202 submits the example to a PROSE™ service or another synthesizer 208 (mark of Microsoft Corporation), and in this particular case gets two things back from the synthesizer: a regex 404, 210 and a transform 212. For the specific example above, a suitable synthesized regex is:
_platformActions\.InstallApp\((*)\)
and a suitable synthesized transform is:
this.Platform( ).App($1).Install( )

Then the enhanced system 202 uses the synthesized regex to locate a "find like this" match 414 in the source code, applies the synthesized transform to a copy of the match to show what the match will be replaced by, and displays the match and the transformed match copy to the user, who then decides whether to actually perform the transform on the source code.

One of skill informed by the teachings herein may notice that examples 410 of text to find, examples 412 of replacement text, or both, may include variable names, routine names, module names, package names, library names, globally defined constants, or other identifiers of the kind routinely used in source code 214. Autocompletion 418 functionality which is provided in some editors (enhanced or otherwise) outside the context of find-replace operations 402, 442 may be adapted for use in entry of examples 410, 412, or both. Thus, in the particular scenario above, after the user has typed "_pla" autocompletion may present a drop-down menu, tooltip content, or other list of suggested completions which includes "_platformActions". Similarly, after "_platformActions.I" has been entered by typing or autocompletion or a combination thereof, autocompletion 418 in the enhanced system 202 may present a list of suggested completions which includes "_platformActions.InstallApp" or "_platformActions.InstallApp(x,y,z)".

More generally, in some embodiments autocompletion complements example-driven text replacement 402, 410 or the example-driven find 402 portion thereof. Some systems 202 include an autocompletion functionality 418 which is configured to operate at least while the system 202 is receiving the example 304.

One of skill further informed by the teachings herein may notice that a given synthesizer 208 may accept multiple examples 304, may accept different kinds of examples 304, or both. Examples 304 may include or be accompanied by synthesizer constraints 430 which guide the synthesis of pattern match codes 201 or transforms 212 or both.

In particular, in some embodiments a user can exercise control 420 over aspects of the generality 408 of the examples 304 that are submitted to the synthesizer 208. Depending on the embodiment, a user may be able to tell the system 202 to be more general or less general; this is control 420 exercised by making a selection 426 of a generality level 422. Another thing the user may be able to do is tell the system 202 what to make more general or less general; this is control 420 exercised by making a selection 428 of a generality route 424.

A given embodiment may support doing both kinds of control. For instance, in some embodiments a user could tell the system 202 to give more matches or fewer matches (via generality level selection 426) for the parameter list "x,y,z" (a generality route 424) in "_platformActions.InstallApp(x, y,z)". In the user interface 220, a generality level control 420, 426 may be implemented, e.g., as slider bar, radio button (e.g., generalize with a tight focus, medium focus, or broad focus to get fewer or more matches), or a similar GUI component. In the user interface 220, a generality route control 420, 428 may be implemented, e.g., as menu, radio button (e.g., generalize variable names, parameter lists, or all identifiers), or a similar GUI component. The number of matches 414 actually found may also be displayed, or used as a filter or criterion in determining an acceptable generality level, e.g., finding only one match probably means more generality is desirable and finding ten thousand matches probably means less generality is desirable.

Accordingly, in some embodiments, the enhanced system 202 includes a generality control functionality 420 which is configured to perform at least one of the following upon execution: obtain a generality level selection 426 through the user interface and submit a generality constraint 430 to the pattern match code and transform synthesizer 208, the generality constraint being based on the generality level selection; or obtain a generality route selection 428 through the user interface and submit a generality constraint 430 to the pattern match code and transform synthesizer 208, the generality constraint being based on the generality route selection.

One of skill further informed by the teachings herein may notice that a given synthesizer 208 may create multiple pattern match codes 210, may create multiple transforms 212, or both. Some embodiments simply return the first pattern match code 210 or the first transform 212 for use in finding matches or making replacements. However, some embodiments show a user the prospective effects of different synthesized items 210, 212, and allow the user to choose from among the synthesized items. This choice can be viewed as a form of user feedback 432, with the feedback values limited to "keep" or "discard" or a similar division into two categories.

Some embodiments allow users to provide more detailed feedback 432, such as by ranking 318 the synthesized items relative to one another. Ranking 318 may be explicit, or it may be implicit in feedback 432 from the user that specifies which matches 414 to keep and which matches to discard. For instance, if seven matches from synthesized regex A were kept, three from synthesized regex B were kept, and nine from synthesized regex C were kept, then the ranking 318 in order of decreasing desirability is regex C, regex A, regex B. Replacements 442 may be similarly ranked on the basis of user feedback.

In some embodiments, the system 202 includes a match refinement functionality 434 which is configured to obtain user feedback 432 about match desirability through the user interface and is also configured to submit a match refinement constraint 436 to the pattern match code and transform synthesizer 208. The match refinement constraint 436 is based on the user feedback about match desirability.

Although the teachings herein may be applied in various development environments, it is contemplated that many embodiments will be used in some scenario where the source code 241 is being edited in an IDE 308. Thus, in some embodiments the software development tool 204 includes an integrated development environment 308. Some IDEs 308 which are suitable for enhancement as taught herein include a Microsoft® Visual Studio® integrated development environment (Microsoft and Visual Studio are marks of Microsoft Corporation), a NetBeans® integrated development environment (NetBeans is a mark of Oracle America, Inc.), an Eclipse™ integrated development environment (Eclipse is a mark of Eclipse.org Foundation, Inc.) and other integrated development environments.

In some embodiments, the user interface 220 is a command line interface or a graphical user interface (GUI), although it is contemplated that many embodiments will have a graphical user interface 220. The user interface 220 may use or include suitably adapted mechanisms such as a dialog box, a grid of actual enhanced find 402 results 440, a grid of prospective 438 or actual find-replace 402 and 442 results 440, a comma-separated list of matches 414, 440 or of synthesized items 210 or 212, or other command-line or GUI interaction mechanisms.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, ranking mechanisms, operation sequences, data structures, or GUI presentation functionalities, for instance, and may otherwise depart from the examples provided herein.

Processes (a.k.a. Methods)

Figure 6:
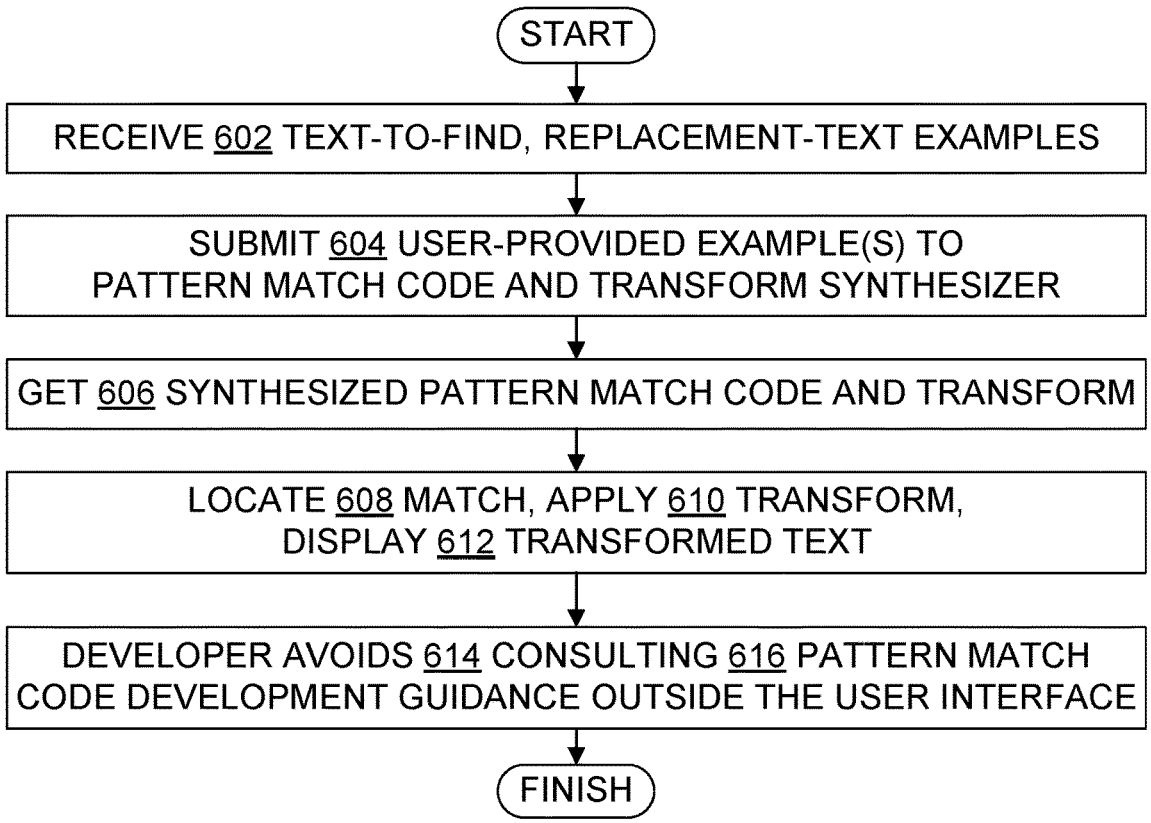
FIG. 6 is a flowchart illustrating steps in some example-driven find-replace methods, which are software development workflow methods.
Figure 7:
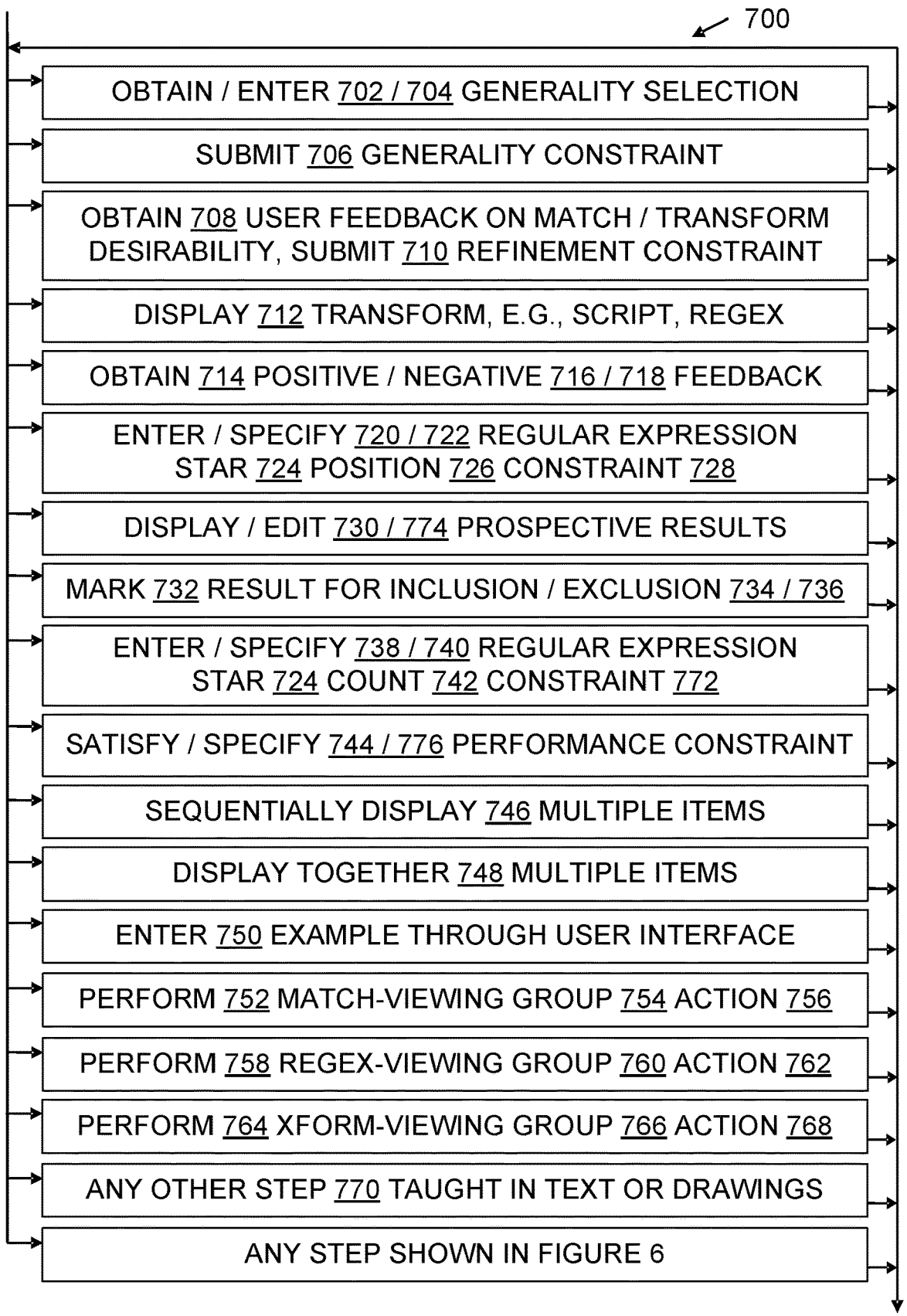
FIG. 7 is a flowchart further illustrating steps in some software development workflow methods.

FIG. 6 illustrates a family of example-driven find-replace methods 600 that may be performed or assisted by an enhanced system, such as system 202 or another functionality 206 enhanced system as taught herein. FIG. 7 further illustrates example-driven text pattern match methods and other software development workflow methods 700 (which may also be referred to as "processes" in the legal sense of that word) that are suitable for use during operation of a system which has innovative functionality taught herein. FIG. 7 includes some refinements, supplements, or contextual actions for steps shown in FIG. 6, as well as methods which do not necessarily involve steps of FIG. 6. FIG. 7 as a whole does incorporate all steps shown in FIG. 6, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For instance, in many situations a developer 104 will manually type in at least the initial portion of an example 410 or an example 412, or will manually direct an editor cut-and-paste sequence, to place an example 410 or 412 in a dialog box or another GUI component of an implementation of a find-replace feature 314. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 6 and 7. Steps may be performed serially, in a partially overlapping manner, or fully in parallel. In particular, the order in which flowchart 600 or flowchart 700 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a software development workflow method 700 that is suitable for performance by a software development tool 204 which has a user interface 220, including the following steps: receiving 602 through the user interface a text-to-find example 410 and a corresponding replacement-text example 412; submitting 604 the examples to a pattern match code and transform synthesizer 208; getting 606 from the pattern match code and transform synthesizer a first pattern match code 210 and a corresponding first transform 212; locating 608 in the source code a first match, namely, an instance 414 of source code text that matches a first pattern 222 that is defined by the first pattern match code; applying 610 the first transform 212, thereby producing a first transformed text 416, the first transform being applied to at least one of the following: the first match, or a copy of the first match; and displaying 612 the first transformed text in the user interface.

In addition to showing what happened (or what will happen) to the matching text by applying the transform, some embodiments show 712 the user the transform 212 itself. This displayed transform 212 may be, e.g., a regular expression 404 with $1 etc. capture groups, or a script 406 or a macro 406. The matching text 414 and corresponding transform 212 may also be displayed in a tooltip 324, dialog box, table, grid, or other GUI 220 form. More generally, in some embodiments the method includes displaying 712 the first transform 212 in the user interface 220.

Some methods use or provide one or more generality 408 controls 420. Some controls 420 obtain 703 a generality level selection 426 through the user interface and submit 706 a generality constraint 430 to the pattern match code and transform synthesizer 208, the generality constraint being based on the generality level selection 426. Some controls 420 obtain 703 a generality route selection 428 through the user interface and submit 706 a generality constraint 430 to the pattern match code and transform synthesizer 208, with the generality constraint being based on the generality route selection 428.

Some controls 420 operate in response to a user command 326 received through the user interface by specifying 722 a regular expression star position constraint 728 to the pattern match code and transform synthesizer 208. For instance, using some controls a user can say where to put a * in the regex, e.g., by doing it in the example 410 or by selecting or highlighting part of the example 410 and entering a "generalize this" command.

Some controls 420 operate in response to a user command 326 received through the user interface by specifying 740 a regular expression star count constraint 772 to the pattern match code and transform synthesizer 208. For instance, using some controls a user can say how many *s to put in the regex 404.

Some controls allow a user to automatically or manually choose between synthesized regexes 210 based on how many instances 414 they respectively match in the source code 214. For instance, some controls 420 get 606 from the pattern match code and transform synthesizer a second pattern match code, and rank 318 the pattern match codes based at least on part on how many instances of source code match according to each pattern match code.

Some controls do more than one of the things described above, and some controls 420 do all of them.

Some allow or prompt for feedback 432 from a user specifying which matches or transforms to keep and which to discard. This may be implemented, e.g., using table or list of items to include 734 or exclude 736 or by ranking 318 items higher or lower. Inclusion 734 and exclusion 736 may involve, e.g., a right click or a check box. Ranking 318 may involve, e.g., a drag and drop operation.

Some ranking mechanisms 316 obtain 714, 708 through the user interface a positive user feedback 716, 432 about desirability of a particular match 414, and submit 710 a match refinement constraint 436 to the pattern match code and transform synthesizer 208, the match refinement constraint being based on the positive user feedback about desirability of the particular match. Some ranking mechanisms 316 obtain 714, 708 through the user interface a negative user feedback 718, 432 about desirability of a particular match 414, and submit 710 a match refinement constraint 436 to the pattern match code and transform synthesizer, the match refinement constraint being based on the negative user feedback about desirability of the particular match.

Some ranking mechanisms 316 obtain 714, 708 through the user interface a positive user feedback 716, 432 about desirability of a particular transform 212, and submit 710 a transform refinement constraint 436 to the pattern match code and transform synthesizer 208, the transform refinement constraint being based on the positive user feedback about desirability of the particular transform. Some ranking mechanisms 316 obtain 714, 708 through the user interface a negative user feedback 718, 432 about desirability of a particular transform 212, and submit 710 a transform refinement constraint 436 to the pattern match code and transform synthesizer 208, the transform refinement constraint being based on the negative user feedback about desirability of the particular transform.

Some ranking mechanisms 316 obtain 714, 708 through the user interface a user feedback 432 which places two matches 414 in a match desirability ranking 318 relative to each other, and submit 710 a match refinement constraint 436 to the pattern match code and transform synthesizer 208, the match refinement constraint being based on the match desirability ranking. Some ranking mechanisms 316 obtain 714, 708 through the user interface a user feedback 432 which places two transforms 212 in a transform desirability ranking 318 relative to each other, and submit 710 a transform refinement constraint 436 to the pattern match code and transform synthesizer 208, the transform refinement constraint being based on the transform desirability ranking.

Some ranking mechanisms 316 do more than one of the things described above, and some ranking mechanisms 316 do all of them.

In some embodiments, a table or grid may show results of a match and what the transformed text would be. The term "list" as used here includes tables, grids, sequential presentation formats, and so on. "Prospective" means the transform has not yet been applied to alter the source code file's actual text. In some embodiments, the method includes displaying 730 in the user interface a prospective results 440 list which includes multiple prospective text replacement results, each prospective text replacement result including a copy of an instance 414 of source code text 214 that matches according to the first pattern match code 210 and also including a corresponding transformed text 416 for each copy.

In some embodiments, a table or grid of match results and prospective transformed texts may be editable, e.g., it may be edited by a developer to include or exclude particular prospective transformed texts prior to executing a user command to replace all selected matches as indicated per the inclusions and exclusions. Thus, in some embodiments, the method further includes the software 312 editing the prospective results list in response to user input, the editing including at least one of the following: marking 732 in memory 112 a particular prospective text replacement result for inclusion 734 in a set of text replacements authorized by the user, or marking 732 in memory 112 a particular prospective text replacement result for exclusion 736 from a set of text replacements authorized by the user.

An acceptable performance speed may be beneficial or in some scenarios critical to acceptance and usage of example-driven text pattern match functionality 206 by developers. Acceptability may be defined, for instance, as satisfaction 906 of one or more specified 776 performance criteria 322 regarding speed or responsiveness. One of skill may select the specific performance criteria 322 to apply in a given implementation or scenario, based on developer expectations and experiences.

One cutoff criterion 322 holds that the time 502 elapsed from finishing receiving the user-provided examples 410 and 412 to finishing applying 610 the transform 212 and showing 612 the transform result 416 in the user interface is not more than five hundred milliseconds. Another, stricter cutoff criterion 322 holds that said time is not more than two hundred fifty milliseconds.

Another cutoff criterion 322 holds that the time 502 elapsed from finishing receiving the user-provided examples 410 and 412 to getting 606 a regex 210 and transform 212 from the synthesizer 208 and showing 712 the transform 212 in the user interface is not more than five hundred milliseconds. Another, stricter cutoff criterion 322 holds that said time is not more than two hundred fifty milliseconds.

Another criterion 322 holds that the enhanced system pops up or otherwise provides an autocompletion list 418 for an example 304 while the example is being typed by the user.

In some embodiments, the system 202 satisfies at least one of the foregoing performance criteria 322. In some, the system satisfies 744 at least two of the foregoing performance criteria 322, and in some the system 202 satisfies all three. Other performance criteria 322 may also be satisfied. Accordingly, in some embodiments the method further includes satisfying 744 at least one of the following performance criteria 322: the time elapsed 502 from finishing receiving 602 the examples 304 to finishing displaying 612 the first transformed text 416 in the user interface 220 is not more than five hundred milliseconds; the time elapsed 502 from finishing receiving 602 the examples 304 to finishing displaying 712 the first transform 212 in the user interface 220 is not more than five hundred milliseconds; or the method displays 748 an autocompletion 418 list of suggestions for completing the text-to-find example 410 while the text-to-find example is being received 602 in the user interface 220.

Some embodiments facilitate a full cycle of refinement 434 using feedback 432 from a developer 104. In some scenarios, this cycle includes receiving 602 one or more examples 304 from a user, submitting 604 at least one of these examples 304 to the synthesizer 208, getting one or more synthesized items (210 or 212 or both, possibly also with synthesized clarifying examples) created in response to the submitted example(s), informing (e.g., via one or more of steps 612, 712, 730, 752, 758, 764) the user about the synthesized item(s), obtaining (e.g., via one or more of steps 708, 714, 702) user feedback 432 about the synthesized item(s), and submitting 710 one or more refinement constraints (e.g., 436, 706, 728, 772, 734 marking, 736 marking) to the synthesizer 208, which then creates one or more refined items 210 or 212 or both based at least in part on the refinement constraints.

In some embodiments, the method includes: obtaining 708 through the user interface a user first feedback 432 about at least one of: the first pattern match code 210, the first transform 212, or the first transformed text 416; submitting 710 a refinement constraint 436 to the pattern match code and transform synthesizer 208, the refinement constraint being based on the user first feedback; getting 606 from the pattern match code and transform synthesizer at least one of: a refined pattern match code 210, or a refined transform 212; and performing at least one of: locating 402 in the source code a refined match 414 which includes an instance of source code text 214 that matches according to the refined pattern match code, or applying 610 the refined transform 212 to produce a refined transformed text 416 and displaying 612 the refined transformed text in the user interface.

Some embodiments facilitate scenarios where the user is shown multiple synthesized results (210 or 212 or both), either sequentially (1-by-1 or N-by-N) or all on the display together at the same time ("displaying together"). For instance, in some embodiments a user may slide or iterate by "next" button through multiple synthesized regexes 210, in some a user may slide or iterate by "next" button through multiple synthesized transforms 212, in some a user may be shown a list of multiple synthesized regexes at the same time, and in some a user may be shown a list of multiple synthesized transforms at the same time. Some embodiments can provide two, or three, or all four of these user experiences.

Accordingly, in some embodiments the method includes at least one of the following: sequentially displaying 746 a set of multiple pattern match codes 210 in the user interface, all pattern match codes in the set being based on the same one or more examples 304 submitted 604 to the pattern match code and transform synthesizer 208; sequentially displaying 746 a set of multiple transforms 212 in the user interface, all transforms in the set being based on the same one or more examples 304 submitted 604 to the pattern match code and transform synthesizer 208; displaying together 748 a set of multiple pattern match codes 210 in the user interface, all pattern match codes in the set being based on the same one or more examples 304 submitted 604 to the pattern match code and transform synthesizer; or displaying together 748 a set of multiple transforms 212 in the user interface, all transforms in the set being based on the same one or more examples 304 submitted 604 to the pattern match code and transform synthesizer 208.

In some embodiments, a user 104 could effectively submit multiple examples to the synthesizer at a time, by entering 750 the multiple examples into the user interface as a set. In some embodiments, the method performed by an enhanced system 202 includes receiving 602 through the user interface a plurality of text-to-find examples 410 and a corresponding plurality of replacement-text examples 412, and submitting 604 the pluralities of examples to the pattern match code and transform synthesizer 208.

Some embodiments receive 602 multiple examples 410 for a regex 210; a given single example 410 may often be consistent with multiple regular expressions 210, so additional examples will be used for disambiguation. For instance, assume that "abc*" is a regular expression which matches any input string that has "ab" followed by zero or more instances of "c", and that "abc+" is a regular expression which matches any input string that has "ab" followed by one or more instances of "c". Then "ababab" is a disambiguating example 410 with respect to these two regexes 210 because "ababab" is in the set of all match outputs of the regex "abc*" but is not in the set of all match outputs of the regex "abc+". The multiple examples 410 may be separated by an example separator, such as a comma or another specified character or character sequence, for instance, or a graphical interaction may be used, such as filling in a spreadsheet (possibly with autocompletion 418).

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as match presentation software 312, ranking mechanisms 316, commands 326, examples 304, generality controls 420, prospective results 440, pattern match code 210, transforms 212, and refinement constraints 436, in the form of data 118 and instructions 116, read from a removable storage medium 114 and/or another source such as a network connection, to form a configured storage medium. The configured storage medium 112 is capable of causing a computer system 102 to perform technical process steps for example-driven text pattern match functionality 206 and related functionalities, as disclosed herein. The Figures thus help illustrate configured storage media embodiments and process (a.k.a. method) embodiments, as well as system and process embodiments. In particular, any of the process steps illustrated in FIG. 6 or 7 or otherwise taught herein, may be used to help configure a storage medium to form a configured storage medium embodiment.

The storage medium embodiments have corresponding user activity embodiments, e.g., a user entering an example corresponds with a system or automated method receiving the example, a user viewing an item on a display corresponds with the system or automated method displaying the item, a user assigning a feedback corresponds with the system or automated method obtaining the feedback, and so on. Accordingly, the description of storage medium embodiments and automated method embodiments also serve to one of skill in the art as descriptions of user activity embodiments. Also, reference numerals may be used interchangeably for the user-activity perspective and the automated-system-or-method perspective, e.g., 602 may refer in one context to a system 202 receiving an example 304 and also refer in another context to a user entering an example 304.

Some embodiments use or provide a computer-readable storage medium 112, 114 configured with data 118 and instructions 116 which upon execution by at least one processor 110 cause a computing system to perform a software development workflow method under user interaction. This method includes: receiving (via the user entering 750) through a user interface of a development tool a text-to-find example; and the user performing 752 at least one match-viewing action 756 of a match-viewing action group 754, the match-viewing action including viewing in the user interface at least one match 414 which is an instance of source code text that differs from the text-to-find example 410 and also matches the text-to-find example according to a regular expression which is part of a pattern match code 210. In some embodiments the match-viewing action group 754 includes: viewing 756 multiple matches in the user interface; viewing 756 multiple matches in the user interface and ranking 318 the matches relative to one another; viewing 756 multiple matches in the user interface and assigning 714 a positive feedback 716 to at least one match; or viewing 756 multiple matches in the user interface and assigning 714 a negative feedback 718 to at least one match.

In some embodiments, a method 700 includes at least one of the following sequences.

A first sequence 764 includes entering 750 through the user interface a replacement-text example 412, the replacement-text example having a transformation relationship with the text-to-find example 410 in that a transform 212 applied to the text-to-find example produces the replacement-text example, viewing 768 in the user interface a transformed text 416, the transformed text differing from the replacement-text example, the transformed text having the same transformation relationship with the match that the replacement-text example has with the text-to-find example, and wherein the first sequence performs 764 at least one action 768 of a transformed text-viewing action group 766 which includes: viewing 768 multiple transformed texts in the user interface; viewing 768 multiple transformed texts in the user interface and ranking 318 the transformed texts relative to one another; viewing 768 multiple transformed texts in the user interface and assigning 714 a positive feedback 716 to at least one transformed text; or viewing 768 multiple transformed texts in the user interface and assigning 714 a negative feedback 718 to at least one transformed text.

A second sequence 758 includes performing at least one action 762 of a regular-expression 404 viewing action group 760 which includes: viewing 762 the regular expression in the user interface; viewing 762 multiple regular expressions in the user interface; viewing 762 multiple regular expressions in the user interface and ranking 318 the matches relative to one another; viewing 762 multiple regular expressions in the user interface and assigning 714 a positive feedback 716 to at least one regular expression; viewing 762 multiple regular expressions in the user interface and assigning 714 a negative feedback 718 to at least one regular expression.

A third sequence which includes entering 750 through the user interface a replacement-text example 412, the replacement-text example having a transformation relationship with the text-to-find example 410 in that a transform 212 applied to the text-to-find example produces the replacement-text example, viewing 612 in the user interface a transformed text, the transformed text differing from the replacement-text example, the transformed text having the same transformation relationship with the match that the replacement-text example has with the text-to-find example. In some embodiments, the third sequence performs 764 at least one action of a transform viewing action group 766 which includes: viewing 712 the transform in the user interface; viewing 712 multiple transforms in the user interface; viewing 712 multiple transforms in the user interface and ranking 318 the transforms relative to one another; viewing 712 multiple transforms in the user interface and assigning 714 a positive feedback 716 to at least one transform; or viewing 712 multiple transforms in the user interface and assigning 714 a negative feedback 718 to at least one transform.

Some embodiments perform at least two of the sequences described above, over time. Some perform all three sequences at one time or another.

Some embodiments facilitate scenarios where a user commands the enhanced development tool 204, 202 to "replace all matches" or "replace all selected matches". In some embodiments, the method includes entering a single command 326 in the user interface to perform multiple example-driven text replacements 442 in the source code based on at least the text-to-find example 410 and the replacement-text example 412.

In some embodiments, the method includes at least one of the following: entering 704 an example-driven text replacement generality level selection 426 through the user interface; entering 704 an example-driven text replacement generality route selection 428 through the user interface; entering 720 an example-driven text replacement regular expression star position 726 through the user interface; or entering 738 an example-driven text replacement regular expression star count 742 through the user interface.

It is contemplated that human-visible performances that are shown to a developer in real time will be the most frequent performances of the functionality 206. However, example-driven text pattern-matching could also be performed in a batch manner on one or more files or streams of source code 214 by using examples 304 read from another file or stream, by reading the source code and examples 304 into working memory 112 without also displaying them for view on a screen 126, submitting 604 the examples, getting 606 synthesized items 210 or 212 or both, applying 610 transforms 212 when they are gotten, and saving and closing the modified file or forwarding the modified stream, all without necessarily displaying the source code while this particular method 700 is being performed.

ADDITIONAL EXAMPLES AND OBSERVATIONS

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide technical advantages through enhancement of software development tools. In some scenarios, these technical advantages are better than the alternatives of struggling to write regular expressions 404 manually, or failing to take advantage of the power of regular expression 404 in searches 402.

The following are offered as three sets of specific examples 304 with some corresponding synthesized items (pattern match codes 210 in the form of regexes, transforms 212 in the form of regex-compatible script instructions).

```
Set One
_platformActions.InstallApp(x, y, z)       // text-to-find example from user
this.Platform( ).App(x, y, z).Install( )    // replacement-text example from user
_platformActions.InstallApp\((.+)\)         // pattern match regex from synthesizer
this.Platform( ).App($1).Install( )         // transform from synthesizer
Set Two
<h1>content</h1>                            // text-to-find example from user
content                                // replacement-text example from user
<h1>(.+)<Vh1>                               // pattern match regex from synthesizer
$1                                     // transform from synthesizer
Set Three
#include "whatever.h"                       // text-to-find example from user
#include <whatever>                          // replacement-text example from user
#include "(.+)\.h"                           // pattern match regex from synthesizer
#include <$1>                                // transform from synthesizer
```

Technical Character

The technical character of embodiments described herein will be apparent to one of ordinary skill in the art, and will also be apparent in several ways to a wide range of attentive readers. Some embodiments address technical activities such as finding 402 a string that matches a regular expression 404, replacing 442 one string with another string, communicating 604, 606 between a user development tool 204 and a code synthesizer 208, satisfying 744 software performance criteria 322, and providing a functionally enhanced 206 and comfortable software development workflow 320, each of which is an activity deeply rooted in computing technology. Some of the technical mechanisms discussed include, e.g., code for autocompletion 418, ranking mechanisms 316, pattern match code 210, text transforms 212, synthesizer constraints 436, 430, and example-driven code synthesizers 208. Some of the technical effects discussed include, e.g., surfacing automatically synthesized pattern match codes 210, surfacing automatically synthesized text transforms 212, refinement 434 of synthesizer 208 results via user feedback 432, and providing developers with the power of regular expression 404 searches without removing focus from a tool user interface 220 to consult 616 external guidance 218. Thus, purely mental processes are clearly excluded. Other advantages based on the technical characteristics of the teachings will also be apparent to one of skill from the description provided.

Some embodiments described herein may be viewed by some people in a broader context. For instance, concepts such as accuracy, clarity, comfort, creation, ease of use, ordering, or speed may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and accurately perform find 402 and replace 442 operations in a file of program source code 214. Other configured storage media, systems, and processes involving accuracy, clarity, comfort, creation, ease of use, ordering, or speed are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, pattern match codes or transforms, software processes, development tools, identifiers, pattern match code guidance, code-by-example technologies, programming languages, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
TCP: transmission control protocol
TPU: tensor processing unit
UDP: user datagram protocol
UEFI: Unified Extensible Firmware Interface
URI: uniform resource identifier
URL: uniform resource locator
WAN: wide area network
XFORM: transform Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers), or automatically generated or automatically synthesized.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

"Software development workflow" means steps or actions taken by or on behalf of a software developer during software code creation or modification or testing or debugging or profiling or deployment or monitoring.

A "source code" is code in human-readable text form in a programming language, with the understanding that code includes more than merely data values—code includes statements, expressions, identifiers, variable declarations, functions, etc. Code in general (as opposed to source code 214 in particular) also includes synthesizer results 210, 212 but excludes mere constants in and of themselves, e.g., a column or table of numbers.

The "execution" of a code implies compiling the code and running the compiled code, or interpreting the code; the distinction between compilers and interpreters is acknowledged herein but does not prevent beneficial application of the teachings herein with either category of code.

Some examples of guidance 218 include online developer forums, user manuals, code listings, and any other document that discusses or includes regex syntax, regex semantics, transform syntax or semantics, or an example of pattern match code or scripts or macros for text editing.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Example-driven text pattern match operations such as receiving 602 examples through a user interface 220, performing electronic software-to-software communications 604, 606 between match presentation software 312 and a synthesizer 208, obtaining 702 user selections 726, 728 through a user interface, obtaining 708, 714 user feedback 432 through a user interface, and many other operations discussed herein, are understood to be inherently digital. A human mind cannot interface directly with a CPU or other processor, or with RAM or other digital storage, or with a display 126, to read and write the necessary data to perform the example-driven text pattern match steps (for find 402, for replace 442, or both) that are taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, constraining, displaying, editing, entering, excluding, finding, generalizing, getting, including, locating, marking, matching, obtaining, performing, receiving, refining, replacing, satisfying, selecting, specifying, submitting, synthesizing, transforming (and applies, applied, constrains, constrained, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., a software developer or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, identifier autocompletion software, simulators, fuzzers, repository access tools, version control tools, optimizers, collaboration tools, other software development tools and tool suites (including, e.g., integrated development environments), hardware development tools and tool suites, diagnostics, enhanced browsers, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 (nodes 102) enhanced with example-driven text pattern match functionality 204 software development tool with functionality for editing source code, either interactively (contemplated as the most frequent scenario) or in a batch mode; some examples include IDEs and source code text editors 206 example-driven text pattern match functionality, e.g., functionality which does at least one of the following: communicates with a synthesizer 208, offers an example-driven find 402 feature to a developer in a user interface based on an example 410, offers an example-driven find-replace feature to a developer in a user interface based on examples 410 and 412, conforms with the FIG. 7 flowchart or its constituent flowchart 600, or otherwise provides capabilities first taught herein 208 example-driven synthesizer of pattern match codes or of both pattern match codes 210 and transforms 212; 208 also refers to the synthesis activity performed by such as synthesizer 210 pattern match code 212 text transform code; also referred to simply as "transform" or "xform"

214 source code; presumed to be in a programming language 218 guidance regarding pattern match codes or transforms 220 user interface, e.g., GUI or command line interface 222 pattern defined by a pattern match code, e.g., the set of all strings which are considered matches to a regular expression 302 example-driven text find-replace functionality 304 user-provided example, e.g., a string which illustrates text to find, or a string or pair of strings which illustrate text replacement 306 source code editor, e.g., an editor in an IDE, or a stand-alone editor 308 integrated development environment 310 interface between items in a computing system; interfaces include both hardware and software unless stated otherwise 312 match presentation software 314 a find-replace feature in match presentation software 316 ranking mechanism; operates computationally in a system 202

318 ranking (activity); also refers to a rank (result of ranking activity)

320 software development workflow 322 performance criterion specifying acceptable performance level of at least a portion of functionality 206

324 tooltip in a tool 204 GUI 220

402 find (activity); also refers to a find (result of find activity), and to a feature or other portion of software which performs find activity 404 regular expression; this is a term of art in computing; may also be written as "regex"

406 script, e.g., a set of commands or instructions to control execution of a computing system 408 generality of a pattern matching code or activity 410 example of text to find; this is a particular kind of example 304

412 example of text after replacement; this is a particular kind of example 304

414 instance of text which matches a pattern; may also referred to as a match 414

416 transformed match, e.g., text that results when a transform 212 is applied to a particular match 414 or a copy thereof 418 autocompletion (activity); also refers to an autocompletion (result of autocompletion activity), and to a feature or other portion of software which performs autocompletion activity; e.g., an editing functionality which uses part or all of a typed identifier to compute and display a list of suggestions for completing the identifier 420 generality control, e.g., a software feature which alters match generality level or route or both 422 match generality level 424 match generality route 426 selection of a match generality level (activity); also refers to result of such selection activity 428 selection of a match generality route (activity); also refers to result of such selection activity 430 constraint passed to synthesizer to control match generality level or route or both 432 user feedback 434 refinement of match focus, match generality, replacement focus, or other result of synthesizer 208 or of a computational use of a synthesizer result 436 constraint passed to synthesizer to refine synthesizer 208 activity 438 prospective result of applying a synthesizer result 210 or 212 or both, e.g., an illustration of such applying performed on a copy of a match as opposed to being performed on the match itself inline in the source code 440 result of applying a synthesizer result 210 or 212 or both 442 replace (activity); also refers to a replacement (result of replace activity), and to a feature or other portion of software which performs replace activity 502 elapsed time 504 overlapping operations; when X and Y overlap, at least part of X occurs at the same time as at least part of Y; X may be contained chronologically entirely within Y but X and Y may also overlap when neither is contained entirely in the other 600 flowchart; 600 also refers to example-driven find-replace methods illustrated by or consistent with the FIG. 6 flowchart 602 receive via a user interface one or more user-provided examples 304; accomplished by computation; corresponding send is implied; an example may be entered directly, e.g., through a user typing or pasting in the text of the example itself, or an example may be entered indirectly, e.g., through a user entering a file name, file path, URL, menu selection, or other identifier of one or more examples, such as when a user enters a file name or other resource name and the file or other resource contains the example(s) 304 to be received 602

604 submit one or more user-provided examples 304 to a synthesizer 208; accomplished by computation; may involve procedure calls, APIs, network packets, shared memory, or other computational mechanisms 606 get one or more pattern match codes 210 or transforms 212 or both from a synthesizer 208; accomplished by computation; may involve procedure calls, APIs, network packets, shared memory, or other computational mechanisms 608 locate a match 414 in a source code based on a pattern match code 210; accomplished by computation 610 apply a transform 212 to a string of text; accomplished by computation 612 display one or more transformed texts 416 in a user interface 220; accomplished by computation 614 avoid reliance on code guidance 218 located outside an enhanced workflow 616 consult (e.g., read, query, or copy) code guidance 218

700 flowchart; 700 also refers to software development workflow methods illustrated by or consistent with the FIG. 7 flowchart (which incorporates the steps of FIG. 6)

702 obtain a generality selection; accomplished by computation 704 enter a generality selection 706 submit a generality constraint; a particular kind of submission 604

708 obtain user feedback; accomplished by computation 710 submit a refinement constraint; a particular kind of submission 604

712 display a transform 212 in a user interface 714 obtain positive or negative user feedback; accomplished by computation 716 positive user feedback, e.g., an indication that an item or result is what the user wants, or close to it 718 negative user feedback, e.g., an indication that an item or result is not what the user wants, or far from it 720 enter a regular expression star position constraint 722 specify a regular expression star position constraint; accomplished by computation; a particular kind of obtaining 702

724 regular expression star; a portion of a regular expression that matches multiple values, so named because it is often denoted in a regex by an asterisk, which has a shape reminiscent of a star 726 regular expression star position 728 regular expression star position constraint; a particular kind of generality constraint 730 display prospective results; accomplished by computation 732 mark a result (of a find or replace or both); accomplished by computation 734 inclusion in desired results (activity, or activity result)

736 exclusion from desired results (activity, or activity result)

738 enter a regular expression star count constraint 740 specify a regular expression star count constraint; accomplished by computation; a particular kind of obtaining 702

742 regular expression star count—number of stars in a given regex 744 satisfy one or more performance criteria 322

746 sequentially display multiple items, e.g., such that not all related items are on screen at the same time; accomplished by computation 748 display together multiple items, e.g., such that all related items are on screen at the same time; accomplished by computation 750 enter an example 304 through a user interface 752 perform a match-viewing action 754 group of match-viewing actions 756 match-viewing action 758 perform a regex or other pattern match code-viewing action 760 group of pattern match code-viewing actions 762 pattern match code-viewing action 764 perform a transform-viewing action 766 group of transform-viewing actions 768 transform-viewing action 770 any step discussed in the present disclosure that has not been assigned some other reference numeral 772 regular expression star position constraint; a particular kind of generality constraint

CONCLUSION

In short, the teachings herein provide a variety of example-driven text pattern match functionalities 206 which operate in enhanced systems 202. Accuracy and productivity of software development is enhanced, with particular attention to situations such as upgrades, library changes, or code refactoring where many non-identical text replacements are to be made.

Flexible yet efficient "find" operations 402 search source code 214 for matches 414 to a general pattern 222 after a developer 104 provides 750 an example string 410, 304 that matches the pattern, without requiring the developer to write a regular expression 404 or script 406 that will implement the desired pattern 222. Example-driven find-replace functionality 302, 206 uses regular expressions 404 or other pattern match codes 210, and scripts 406 or other transforms 212, which are synthesized 208 automatically from examples 304 provided 750 by a developer 104. This technology 202, 700 allows the developer 104 to focus on workflow 320 inside an integrated development environment 308 or other development tool 204 instead of breaking focus to search 616 for external documentation 218. Developers also avoid foregoing the flexibility and power of regular expressions 404 and scripts 406. Synthesizer 208 outputs 210, 212 may be directly or indirectly ranked 318 through user feedback 432, allowing their refinement 434. Find match generality 408 may be controlled 420, e.g., by specifying 722 regex star positions 726 or specifying 740 regex star counts 742. Entry 750 of guiding examples 304 may be assisted by autocompletion 418. Performance criteria 322 for some of the enhancement embodiments are also described herein.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 6 and 7 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development system, comprising:
   a digital memory;
   an executable software development tool having a user interface; and
   a processor in operable communication with the memory, the processor configured to perform software development workflow steps for example-driven text replacement in a source code which is displayed in the user interface, the steps including (a) receiving through the user interface a source code text-to-find example and a corresponding source code replacement-text example, (b) submitting the source code text-to-find example and the source code replacement-text example to a pattern match code and transform synthesizer, (c) getting from the pattern match code and transform synthesizer a pattern match code and a corresponding transform, (d) locating in the source code a match, namely, an instance of source code text that matches a pattern defined by the pattern match code, (e) applying the transform to a copy of the match thereby producing a transformed match, and (f) displaying the match and the transformed match in the user interface;
   whereby the system provides a software developer with a pattern matching find-replace functionality without requiring the developer to author the pattern match code or the transform.

2. The system of claim 1, further comprising an autocompletion functionality which is configured to operate at least while the system is receiving the example.

3. The system of claim 1, further comprising a generality control functionality which is configured to perform at least one of the following upon execution:
   obtain a generality level selection through the user interface and submit a generality constraint to the pattern match code and transform synthesizer, the generality constraint being based on the generality level selection; or
   obtain a generality route selection through the user interface and submit a generality constraint to the pattern match code and transform synthesizer, the generality constraint being based on the generality route selection.

4. The system of claim 1, further comprising a match refinement functionality which is configured to obtain user feedback about match desirability through the user interface and is also configured to submit a match refinement constraint to the pattern match code and transform synthesizer, the match refinement constraint being based on the user feedback about match desirability.

5. The system of claim 1, wherein the software development tool includes an integrated development environment.

6. A software development workflow method that is suitable for performance by a software development tool which has a user interface, the method comprising:
 receiving through the user interface a source code text-to-find example and a corresponding source code replacement-text example;
 submitting the source code text-to-find example and the source code replacement-text example to a pattern match code and transform synthesizer;
 getting from the pattern match code and transform synthesizer a first pattern match code and a corresponding first transform;
 locating in the source code a first match, namely, an instance of source code text that matches a first pattern that is defined by the first pattern match code;
 applying the first transform, thereby producing a first transformed text, the first transform being applied to at least one of the following: the first match, or a copy of the first match; and
 displaying the first transformed text in the user interface.

7. The method of claim 6, further comprising displaying the first transform in the user interface.

8. The method of claim 6, further comprising at least one of the following:
 obtaining a generality level selection through the user interface and submitting a generality constraint to the pattern match code and transform synthesizer, the generality constraint being based on the generality level selection;
 obtaining a generality route selection through the user interface and submitting a generality constraint to the pattern match code and transform synthesizer, the generality constraint being based on the generality route selection;
 in response to a user command received through the user interface, specifying a regular expression star position constraint to the pattern match code and transform synthesizer;
 in response to a user command received through the user interface, specifying a regular expression star count constraint to the pattern match code and transform synthesizer; or
 getting from the pattern match code and transform synthesizer a second pattern match code, and ranking the pattern match codes based at least on part on how many instances of source code match according to each pattern match code.

9. The method of claim 6, further comprising at least one of the following:
 obtaining through the user interface a positive user feedback about desirability of a particular match, and submitting a match refinement constraint to the pattern match code and transform synthesizer, the match refinement constraint being based on the positive user feedback about desirability of the particular match;
 obtaining through the user interface a negative user feedback about desirability of a particular match, and submitting a match refinement constraint to the pattern match code and transform synthesizer, the match refinement constraint being based on the negative user feedback about desirability of the particular match;
 obtaining through the user interface a positive user feedback about desirability of a particular transform, and submitting a transform refinement constraint to the pattern match code and transform synthesizer, the transform refinement constraint being based on the positive user feedback about desirability of the particular transform;
 obtaining through the user interface a negative user feedback about desirability of a particular transform, and submitting a transform refinement constraint to the pattern match code and transform synthesizer, the transform refinement constraint being based on the negative user feedback about desirability of the particular transform;
 obtaining through the user interface a user feedback which places two matches in a match desirability ranking relative to each other, and submitting a match refinement constraint to the pattern match code and transform synthesizer, the match refinement constraint being based on the match desirability ranking; or
 obtaining through the user interface a user feedback which places two transforms in a transform desirability ranking relative to each other, and submitting a transform refinement constraint to the pattern match code and transform synthesizer, the transform refinement constraint being based on the transform desirability ranking.

10. The method of claim 6, further comprising displaying in the user interface a prospective results list which includes multiple prospective text replacement results, each prospective text replacement result including a copy of an instance of source code text that matches according to the first pattern match code and also including a corresponding transformed text for each copy.

11. The method of claim 10, further comprising editing the prospective results list in response to user input, the editing including at least one of the following:
 marking a particular prospective text replacement result for inclusion in a set of text replacements authorized by the user; or
 marking a particular prospective text replacement result for exclusion from a set of text replacements authorized by the user.

12. The method of claim 6, further comprising satisfying at least one of the following performance criteria:
 a time elapsed from finishing receiving the examples to finishing displaying the first transformed text in the user interface is not more than five hundred milliseconds;
 a time elapsed from finishing receiving the examples to finishing displaying the first transform in the user interface is not more than five hundred milliseconds; or
 a method displays an autocompletion list of suggestions for completing the source code text-to-find example while the source code text-to-find example is being received in the user interface.

13. The method of claim 6, further comprising:
 obtaining through the user interface a user first feedback about at least one of: the first pattern match code, the first transform, or the first transformed text;
 submitting a refinement constraint to the pattern match code and transform synthesizer, the refinement constraint being based on the user first feedback;
 getting from the pattern match code and transform synthesizer at least one of: a refined pattern match code, or a refined transform; and
 performing at least one of: locating in the source code a refined match which includes an instance of source code text that matches according to the refined pattern match code, or applying the refined transform to produce a refined transformed text and displaying the refined transformed text in the user interface.

14. The method of claim 6, further comprising at least one of the following:
sequentially displaying a set of multiple pattern match codes in the user interface, all pattern match codes in the set being based on the same one or more examples submitted to the pattern match code and transform synthesizer;
sequentially displaying a set of multiple transforms in the user interface, all transforms in the set being based on the same one or more examples submitted to the pattern match code and transform synthesizer;
displaying together a set of multiple pattern match codes in the user interface, all pattern match codes in the set being based on the same one or more examples submitted to the pattern match code and transform synthesizer; or
displaying together a set of multiple transforms in the user interface, all transforms in the set being based on the same one or more examples submitted to the pattern match code and transform synthesizer.

15. The method of claim 6, comprising receiving through the user interface a plurality of source code text-to-find examples and a corresponding plurality of source code replacement-text examples, and submitting the pluralities of examples to the pattern match code and transform synthesizer.

16. A computer-readable storage medium configured with data and instructions which upon execution by a processor cause a computing system to perform a software development workflow method, the method comprising:
receiving through a user interface of a development tool a source code text-to-find example;
submitting the source code text-to-find example to a pattern match code and transform synthesizer;
getting from the pattern match code and transform synthesizer a pattern match code; and
performing at least one match-viewing action of a match-viewing action group, the match-viewing action including displaying in the user interface at least one match which is an instance of source code text that differs from the source code text-to-find example and also matches the source code text-to-find example according to a regular expression which is part of the pattern match code;
wherein the match-viewing action group includes:
displaying multiple matches in the user interface;
displaying multiple matches in the user interface and ranking the matches relative to one another;
displaying multiple matches in the user interface and assigning a positive feedback to at least one match; or
displaying multiple matches in the user interface and assigning a negative feedback to at least one match.

17. The storage medium of claim 16, wherein the method further comprises at least one of the following sequences:
a first sequence which includes receiving through the user interface a source code replacement-text example, the source code replacement-text example having a transformation relationship with the source code text-to-find example in that a transform applied to the source code text-to-find example produces the source code replacement-text example, displaying in the user interface a transformed text, the transformed text differing from the source code replacement-text example, the transformed text having the same transformation relationship with the match that the source code replacement-text example has with the source code text-to-find example, and wherein the first sequence performs at least one action of a transformed text-viewing action group which includes:
displaying multiple transformed texts in the user interface;
displaying multiple transformed texts in the user interface and ranking the transformed texts relative to one another;
displaying multiple transformed texts in the user interface and assigning a positive feedback to at least one transformed text; or
displaying multiple transformed texts in the user interface and assigning a negative feedback to at least one transformed text;
a second sequence which includes performing at least one action of a regular-expression viewing action group which includes:
displaying the regular expression in the user interface;
displaying multiple regular expressions in the user interface;
displaying multiple regular expressions in the user interface and ranking the matches relative to one another;
displaying multiple regular expressions in the user interface and assigning a positive feedback to at least one regular expression; or
displaying multiple regular expressions in the user interface and assigning a negative feedback to at least one regular expression;
or
a third sequence which includes receiving through the user interface a source code replacement-text example, the source code replacement-text example having a transformation relationship with the source code text-to-find example in that a transform applied to the source code text-to-find example produces the source code replacement-text example, displaying in the user interface a transformed text, the transformed text differing from the source code replacement-text example, the transformed text having the same transformation relationship with the match that the source code replacement-text example has with the source code text-to-find example, and wherein the third sequence performs at least one action of a transform viewing action group which includes:
displaying the transform in the user interface;
displaying multiple transforms in the user interface;
displaying multiple transforms in the user interface and ranking the transforms relative to one another;
displaying multiple transforms in the user interface and assigning a positive feedback to at least one transform; or
displaying multiple transforms in the user interface and assigning a negative feedback to at least one transform.

18. The storage medium of claim 17, wherein the method comprises performing at least two of the sequences.

19. The storage medium of claim 17, wherein the method further comprises receiving a single command in the user interface to perform multiple example-driven text replacements in the source code based on at least the source code text-to-find example and the source code replacement-text example.

20. The storage medium of claim 17, wherein the method further comprises at least one of the following:

receiving an example-driven text replacement generality level selection through the user interface;

receiving an example-driven text replacement generality route selection through the user interface;

receiving an example-driven text replacement regular expression star position through the user interface; or receiving an example-driven text replacement regular expression star count through the user interface.

\* \* \* \* \*